US010889773B2

(12) United States Patent
Feustel et al.

(10) Patent No.: US 10,889,773 B2
(45) Date of Patent: Jan. 12, 2021

(54) POLYMER COMPOSITIONS ALLOWING EASIER HANDLING

(71) Applicant: Clariant International Ltd., Muttenz (CH)

(72) Inventors: Michael Feustel, Köngernheim (DE); Matthias Krull, Harxheim (DE); Bettina Siggelkow, Bad Soden (DE); Michael Mörscher, Frankfurt (DE); Ingo Greger, Duisburg (DE); Sebastian Haferkamp, Oberhausen (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 16/065,249

(22) PCT Filed: Dec. 1, 2016

(86) PCT No.: PCT/EP2016/079357
§ 371 (c)(1),
(2) Date: Jun. 22, 2018

(87) PCT Pub. No.: WO2017/108361
PCT Pub. Date: Jun. 29, 2017

(65) Prior Publication Data
US 2019/0002779 A1 Jan. 3, 2019

(30) Foreign Application Priority Data
Dec. 23, 2015 (DE) .................. 10 2015 226 635

(51) Int. Cl.
| C10L 1/14 | (2006.01) |
| C10L 1/196 | (2006.01) |
| C10L 10/16 | (2006.01) |
| C08L 33/08 | (2006.01) |
| C08L 33/10 | (2006.01) |
| C08F 220/18 | (2006.01) |
| C08F 255/02 | (2006.01) |
| C10L 10/14 | (2006.01) |
| C10L 1/192 | (2006.01) |
| C10L 1/195 | (2006.01) |
| C10L 1/197 | (2006.01) |
| C10L 1/198 | (2006.01) |
| C10L 1/16 | (2006.01) |

(52) U.S. Cl.
CPC ............ *C10L 1/143* (2013.01); *C08F 220/18* (2013.01); *C08F 255/026* (2013.01); *C08L 33/08* (2013.01); *C08L 33/10* (2013.01); *C10L 1/192* (2013.01); *C10L 1/195* (2013.01); *C10L 1/1963* (2013.01); *C10L 10/14* (2013.01); *C10L 10/16* (2013.01); *C08F 220/1818* (2020.02); *C10L 1/1616* (2013.01); *C10L 1/1973* (2013.01); *C10L 1/1985* (2013.01); *C10L 2200/0438* (2013.01); *C10L 2200/0461* (2013.01)

(58) Field of Classification Search
CPC combination set(s) only.
See application file for complete search history.

(56) References Cited

U.S. PATENT DOCUMENTS

| 4,608,411 A | 8/1986 | Meunier |
| 2004/0077509 A1* | 4/2004 | Yuki .................. C10M 145/14 508/469 |
| 2007/0062101 A1 | 3/2007 | Delamotte |
| 2007/0161755 A1 | 7/2007 | Siggelkow |
| 2014/0165457 A1* | 6/2014 | Castro ................ C08F 255/026 44/393 |
| 2018/0201865 A1* | 7/2018 | Knapton ............. C10M 149/06 |

FOREIGN PATENT DOCUMENTS

| CA | 2008986 | 8/1990 |
| CA | 2020571 | 1/1991 |
| CA | 2055418 | 5/1992 |
| CA | 2889773 | 6/2014 |
| CN | 103183614 | 7/2013 |
| DE | 10335360 | 2/2004 |
| EP | 0271738 | 6/1988 |
| EP | 0384367 | 8/1990 |
| EP | 0406684 | 1/1991 |
| EP | 0486836 | 5/1992 |
| EP | 1808450 | 7/2007 |
| EP | 3394122 | 10/2018 |
| GB | 2189251 | 10/1987 |
| JP | 2013177554 | 9/2013 |
| WO | 2005023907 | 3/2005 |
| WO | 2005097953 | 10/2005 |
| WO | 2010003892 | 1/2010 |

(Continued)

OTHER PUBLICATIONS

International Preliminary Report on Patentability for PCT/EP2016/079357, dated Feb. 27, 2018, 8 pages.

(Continued)

*Primary Examiner* — Ellen M McAvoy
*Assistant Examiner* — Chantel L Graham
(74) *Attorney, Agent, or Firm* — Tod A. Waldrop

(57) ABSTRACT

The invention relates to a polymer composition that can be obtained by means of the free radical polymerisation of A) 95-40 wt. % of alkyl (meth)acrylate containing Ai) 20-95 wt. % of at least one alkyl (meth)acrylate with 16 to 40 C-atoms in the alcohol group, and Aii) 5-80 wt. % of at least one (meth)acrylic acid ester of a $C_8$-$C_{22}$ alcohol carrying a $C_6$-$C_{20}$ alkyl group in the 2-position relative to the hydroxyl group, in the presence of B) 5-60 wt. % ethylene copolymer. The invention also relates to a method for producing same and to the use of same as a flow improver for mineral oils and mineral oil distillates.

29 Claims, No Drawings

(56) References Cited

FOREIGN PATENT DOCUMENTS

| WO | 2011035947 | 3/2011 |
|----|------------|--------|
| WO | 2014095408 | 6/2014 |
| WO | 2014095412 | 6/2014 |
| WO | 2014118370 | 8/2014 |

OTHER PUBLICATIONS

International Search Report for PCT/EP2016/079357, dated Feb 2, 2017, 2 pages.

* cited by examiner

POLYMER COMPOSITIONS ALLOWING EASIER HANDLING

The present invention provides polymer compositions composed of poly(alkyl (meth)acrylates) and ethylene-vinyl ester copolymers that can be handled in an improved manner at low temperatures, and for the use thereof for improving the cold flow properties of crude oils and of distillates and residue oils produced therefrom.

Crude oils, and also the distillates and distillation residues produced therefrom, are complex mixtures of different kinds of substances, for example saturated and unsaturated hydrocarbons, aromatics, resins and asphaltenes. In the course of cooling of the oils, for example during production, transport, storage and/or further processing, various substances present in the crude oil can present problems. Long-chain n-paraffins in particular can precipitate out after the temperature goes below an oil-specific temperature and form a three-dimensional network of flakes and/or fine needles in which relatively large amounts of liquid constituents are intercalated and retained. Even though the majority of the oil is still liquid, the oil loses its flowability as a result, which means that, for example, transport in pipelines can cease and, in storage tanks, considerable amounts of oil can be trapped between the paraffins that crystallize out at the tank walls in particular. This problem relates not only to crude oils but also to the heavier products produced therefrom, for example middle distillates, heavy heating oil, marine diesel, bunker oil and residue oils, which contain greater amounts of n-paraffins.

Therefore, additives that are intended to improve the flowability of the oil at low temperatures are added in many cases to paraffin-containing mineral oils for transport and storage. These "paraffin inhibitors" are predominantly oil-soluble, synthetic polymeric compounds. These modify the crystal structure of the paraffins that precipitate out in the course of cooling and prevent the formation of a three-dimensional network of paraffin crystals. In some cases, the additives also promote the formation of fine paraffin crystals that have crystallized efficiently and do not agglomerate. Since additives of this kind lower the pour point of the oil, they are also referred to as pour point depressants (PPDs). The pour point refers to the lowest temperature at which a sample of an oil still just flows in the course of cooling. The pour point of oils can be determined, for example, by means of DIN ISO 3016 and ASTM D97.

Active ingredients frequently used for paraffin inhibition are copolymers of ethylene with vinyl esters and/or alkyl (meth)acrylates and poly(alkyl (meth)acrylates), which have different mechanisms of action. In the case of the ethylene copolymers, cocrystallization with paraffins proceeds via the poly(ethylene) sequences of the main chain, the average length of which can be controlled via the comonomer content. In the case of the poly(alkyl (meth)acrylates), by contrast, the length of the side chains thereof is essential and has to fit with the average chain length and hence with the crystallization characteristics of the n-alkanes in the oil to be additized. In this context, linear alkyl radicals having 18 or more carbon atoms are particularly effective. Poly(alkyl acrylates) having branched alkyl radicals, for example the 2-tetradecyloctadecyl radical, according to WO 2010/003892, are ineffective as PPDs.

For combination of the profiles of properties of both classes of polymer, mixtures of the two polymers have also been proposed. In the handling of such additive concentrates, which are produced by mixing the two polymers, problems often occur with phase separation owing to polymer incompatibilities.

To solve the problem of phase separation, it has been suggested that the polymerization of the alkyl acrylate be conducted in solution and in the presence of the ethylene-vinyl ester copolymer. According to commonly accepted theory, at least some of the alkyl acrylate monomers are grafted here onto the ethylene-vinyl ester copolymer, while a further portion polymerizes without being grafted on and hence forms homopolymers or, in the case of use of multiple monomers, copolymers. The at least partial grafting consequently prevents separation of the polymers in the additive concentrate and hence enables the treatment of the oil with an additive that always has the same composition.

U.S. Pat. No. 4,608,411 discloses graft polymers of poly (alkyl acrylates) onto ethylene copolymers. The alkyl acrylates used for grafting derive from alcohol mixtures including at least 20% by weight of alkyl radicals having 22 or more carbon atoms and a proportion of $C_{12}$-$C_{16}$ alcohols of less than 10% by weight.

EP 0384367 discloses mixtures of high and low molecular weight graft polymers of, inter alia, alkyl (meth)acrylates onto ethylene-vinyl ester copolymers as PPDs for fuel oils. For preparation of the alkyl acrylate used for grafting, by way of example, an alcohol mixture of 20% by weight of $C_{16}$ alcohols, 40% by weight of $C_{18}$ alcohols, 10% by weight of $C_{20}$ alcohols and 30% by weight of $C_{22}$ alcohols is used. According to the general description, up to 20% by weight of the alkyl chains of the (meth)acrylate may be branched, but without showing any examples or advantages for this embodiment.

EP 0406684 A discloses additives for middle distillates, comprising at least two different ethylene-vinyl acetate copolymers and optionally a poly(alkyl (meth)acrylate). In example 9, a poly(isodecyl methacrylate) is prepared in the presence of a mixture of two EVA copolymers, which allegedly leads to a mixture of EVAs and a poly(alkyl methacrylate).

EP 0486836 A1 discloses mineral oil middle distillates, for example gas oils, diesel oils or heating oils, which comprise polymeric additives to improve the flow properties under cold conditions. The polymeric additives are combinations of standard ethylene-based flow improvers, for example copolymers of ethylene and vinyl acetate, vinyl propionate or ethylhexyl acrylate, and copolymers of linear or branched $C_8$- to $C_{18}$-alkyl (meth)acrylates and linear or branched $C_{18}$- to $C_{28}$-alkyl vinyl ethers in a weight ratio of 40:60 to 95:5. The copolymers of alkyl (meth)acrylates and alkyl vinyl ethers and the conventional flow improvers may be in the form of a mixture, or the copolymers of the alkyl (meth)acrylates and/or alkyl vinyl ethers may have been wholly or partly grafted onto the conventional flow improvers. The alkyl radicals here are preferably straight-chain and unbranched, but it is possible for up to 20% by weight of cyclic and/or branched components to be present. In the sole example for preparation of a graft copolymer, n-dodecyl acrylate and n-octadecyl vinyl ether are grafted onto a copolymer of ethylene and vinyl propionate having an average molecular weight of about 2500.

WO 2005/023907 discloses pour point depressants containing an ethylene-vinyl acetate copolymer, an ethylene copolymer grafted with alkyl acrylates and/or a poly(alkyl acrylate). The alkyl (meth)acrylates have 6 to 40 and preferably 14 to 30 carbon atoms in the alkyl radical. These mixtures are formulated as dispersions in water.

WO 2005/097953 discloses pour point depressants based on copolymers of maleic anhydride and olefins, which have been reacted with amines and optionally alcohols. The list of suitable alcohols here also mentions $C_{12}$-$C_{36}$ Guerbet alcohols, but without these having been demonstrated by way of example.

EP 1808450 A discloses copolymers of ethylene, vinyl acetate and a further vinyl ester that have been grafted with alkyl acrylates, and the use thereof for improving the cold flow properties of fuel oils. Preferred grafts are esters of acrylic acid with n- or iso-$C_8$-$C_{22}$ alcohols.

WO 2011/035947 discloses compositions comprising a poly(alkyl (meth)acrylate) and an ethylene-vinyl acetate copolymer containing structural units derived from $C_1$-$C_{30}$-alkyl (meth)acrylates, and the use thereof as flow improver in fuel oils. By way of example, EVA copolymers grafted with $C_{12}$/$C_{15}$-alkyl methacrylate or with $C_6$-$C_{18}$-alkyl methacrylate have been documented.

WO 2014/095412 discloses polymeric compositions obtainable by free-radical polymerization of alkyl (meth)acrylates in the presence of at least one EVA copolymer. The alkyl (meth)acrylates are a mixture of (A1a) 50-99 mol % of at least one alkyl (meth)acrylate having a linear $C_{12}$-$C_{60}$-alkyl radical and (A1b) 1 to 49 mol % of at least one alkyl (meth)acrylate having a linear $C_1$-$C_{11}$-alkyl radical, a branched $C_4$-$C_{60}$-alkyl radical and/or a cyclic $C_5$-$C_{20}$-alkyl radical. These compositions are liquid as 48% dilutions in toluene at room temperature without showing phase separation.

The commonly used polymeric paraffin inhibitors are typically prepared by solution polymerization in organic, predominantly aromatic solvents. Owing to the paraffin-like structural elements required for good efficacy and often also high molecular weights of these polymers, the concentrated solutions thereof have intrinsic pour points that are often above the ambient temperatures that exist in use thereof. For use, these additives consequently have to be significantly diluted and/or handled at elevated temperatures, both of which lead to unwanted extra cost and inconvenience. Alternatively, biphasic formulations have been proposed, in which the paraffin inhibitor is dispersed or suspended in a polar nonsolvent, for example water and/or alcohol. To achieve the desired paraffin inhibition, the polymer in these additives has to be transferred from its polar matrix to the nonpolar oil, which often presents difficulties particularly at low temperatures and is manifested in attenuated efficacy.

A problem with the prior art graft polymers is often inadequate flowability of the concentrates at very low temperatures, for example at 10° C., at 5° C. or even at 0° C., which requires significant dilution of the additives, for example, in the case of storage in unheated storage tanks as encountered in many cases in isolated production fields. When the additives are used at low temperatures as well, as, for example, in deep sea production or else in terminals, significant dilution of the additives and/or heating of the conveying lines is required for uninterrupted use. Moreover, the additives, during prolonged storage, for example over several days to weeks, often even above the pour point, form gel phases which lead to loss of flowability thereof. In some cases, efficacy in specific oils is also unsatisfactory.

Consequently, there has been a search for additives which are suitable as paraffin inhibitors and specifically as pour point depressants for paraffin-containing mineral oils and are free-flowing and pumpable as concentrates at low temperatures below 10° C., specifically below 5° C. and especially below 0° C. These additives are to retain their performance and physical properties, such as their flowability in particular, over a prolonged period of several days to weeks, even at low storage temperatures. Furthermore, they are to exhibit a wide range of efficacy in different oils.

It has been found that, surprisingly, polymer compositions obtainable by free-radical polymerization of mixtures of alkyl (meth)acrylates which derive from linear $C_{16}$-$C_{40}$ fatty alcohols on the one hand and from singly branched $C_{12}$-$C_{40}$ alcohols that bear a $C_8$-$C_{20}$-alkyl radical in the 2 position on the other hand, in the presence of copolymers of ethylene and unsaturated esters, bring about excellent pour point depression in paraffin-containing crude and residue oils, and also in various other products produced from crude oils. The concentrates thereof in hydrocarbons are free-flowing even at temperatures below 10° C., in many cases below 5° C. and often below 0° C. They are thus usable even at low temperatures without requiring heated reservoir vessels and/or conveying lines.

The invention provides polymer compositions obtainable by free-radical polymerization of
A) 95-40% by weight of alkyl (meth)acrylate comprising
  Ai) 20-95% by weight of at least one alkyl (meth)acrylate having 16 to 40 carbon atoms in the alkyl radical and
  Aii) 5-80% by weight of at least one (meth)acrylic ester of a $C_8$-$C_{22}$ alcohol that bears a $C_6$-$C_{20}$-alkyl radical in the 2 position to the hydroxyl group, in the presence of
B) 5-60% by weight of at least one ethylene copolymer.

In a preferred embodiment of the invention, the polymer composition further comprises hydrocarbons as solvents/dispersants. Particularly preferred solvents/dispersants are aromatic hydrocarbons.

The invention further provides a process for producing the polymer compositions in which the mixture of A and B is polymerized, optionally in the presence of a solvent, by addition of a free-radical chain initiator.

The invention further provides for the use of the polymer compositions, preferably as a solution or dispersion in hydrocarbons, for improving the cold properties, for example the lowering of the pour point and/or the yield stress, or else improving paraffin dispersion in crude oils, residue oils and also mineral oil products.

The wording "alkyl (meth)acrylates" in all cases embraces esters of acrylic acid and also of methacrylic acid.

Preferred monomers Ai) have the general formula (1)

$$H_2C=C(R^2)-COOR^3 \qquad (1)$$

where
$R^2$ is H or a methyl group and preferably H and
$R^3$ is a linear alkyl radical having 16 to 40 carbon atoms, preferably 18 to 36 carbon atoms, more preferably 18 to 30 carbon atoms, for example 18 to 26 carbon atoms.

Preferred monomers Ai) are esters of acrylic acid where $R^2$ is hydrogen.

Examples of preferred $R^3$ radicals are the 1-hexadecyl, 1-octadecyl, 1-nonadecyl, 1-eicosyl, 1-heneicosyl, 1-docosyl, 1-tetracosyl, 1-hexacosyl, 1-octacosyl and the 1-triacontyl radical. Examples of preferred monomers Ai) are hexadecyl acrylate, octadecyl acrylate, nonadecyl acrylate, eicosyl acrylate, heneicosyl acrylate, docosyl acrylate, tetracosyl acrylate and hexacosyl acrylate.

Particular preference is given to using mixtures of different alkyl (meth)acrylates Ai). For example, it is possible to use mixtures in which $R^3$ represents $C_{16}$ and $C_{18}$ radicals or represents $C_{18}$, $C_{20}$ and $C_{22}$ radicals. In a preferred embodiment, at least one of the alkyl (meth)acrylates Ai) used is 1-docosyl (meth)acrylate and especially 1-docosyl acrylate, i.e. $R^3$ is a linear alkyl radical having 22 carbon atoms. In a particularly preferred embodiment of the invention, at least 25% by weight of the alkyl (meth)acrylates Ai) used is 1-docosyl acrylate. Advantageously, it is possible to use mixtures comprising 1-octadecyl (meth)acrylate, 1-eicosyl (meth)acrylate and 1-docosyl (meth)acrylate. Such mixtures of different (meth)acrylates are obtainable, for example, by esterification of corresponding fatty alcohol mixtures with acrylic acid or methacrylic acid. Some of them are also commercially available. As well as the $C_{18}/C_{20}/C_{22}$ (meth) acrylates mentioned, they may also include small amounts of (meth)acrylates having a higher or lower carbon number as by-products. For example, the mixtures may be those comprising 30% to 50% by weight of 1-octadecyl (meth) acrylate, 10% to 20% by weight of 1-eicosyl (meth)methacrylate and 30% to 60% by weight of 1-docosyl (meth) acrylate. Particular preference is given to mixtures of the abovementioned acrylates.

Preferred alkyl (meth)acrylates Aii) have the general formula (2)

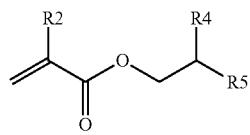

(2)

where
$R^2$ has the definition already given and
$R^4$ and $R^5$ are independently a saturated linear alkyl radical having 6 to 20 carbon atoms and the sum total of the carbon atoms in $R^4$ and $R^5$ is between 16 and 40.

Preferably, the alkyl (meth)acrylates Aii) derive from $C_8$ to $C_{22}$ alcohols which bear an alkyl radical having 6 to 20 carbon atoms in the 2 position to the hydroxyl group. Preferred alcohols for preparation of the esters of the formula (2) have a total of 18 to 36 and especially 18 to 32 carbon atoms, meaning that the sum total of the carbon atoms in the $R^4$ and $R^5$ radicals is preferably 16 to 34 and especially 16 to 30. Preferably, the $R^4$ and $R^5$ alkyl radicals of the alkyl (meth)acrylates Aii) have a different number of carbon atoms. In a particularly preferred embodiment, one of the $R^4$ and $R^5$ radicals has four carbon atoms more than the other. These 2-alkyl-1-alkanols are also referred to as Guerbet alcohols. Particular preference is given to the abovementioned alkyl acrylates Aii).

The alkyl (meth)acrylates Aii) are different than the alkyl (meth)acrylates Ai) and, if appropriate, Aiii).

The alkyl (meth)acrylates A) contain 20% to 95% by weight, preferably 25% to 90% by weight, and especially 30% to 60% by weight, for example 20% to 90% by weight, 20% to 60% by weight, 25% to 95% by weight, 25% to 60% by weight, 30% to 95% by weight or 30% to 90% by weight, of at least one alkyl (meth)acrylate Ai). In addition, they contain 5% to 80% by weight, more preferably 10% to 60% by weight and especially 20% to 55% by weight, for example 5% to 60% by weight, 5% to 55% by weight, 10% to 80% by weight, 10% to 55% by weight, of at least one alkyl (meth)acrylate Aii). In a specific embodiment, the amounts of alkyl (meth)acrylate Ai) and alkyl (meth)acrylate Aii) add up to 100%.

The alkyl (meth)acrylates A) may optionally contain 0% to 40% by weight, preferably 2% to 35% by weight and especially 5% to 30% by weight, for example 0% to 35% by weight, 0% to 30% by weight, 2% to 40% by weight, 2% to 30% by weight, 5% to 40% by weight or else 5% to 35% by weight, of one or more further structural units which derive from further ethylenically unsaturated compounds Aiii).

Suitable further ethylenically unsaturated compounds Aiii) are, for example, ethylenically unsaturated esters of the general formula (3)

(3)

where
$R^2$ has the definition already given and
$R^6$ is a linear alkyl radical having 1 to 11, preferably 2 to 10 and especially 2 to 6 carbon atoms, is a branched alkyl radical having 4 to 17, preferably 4 to 16 and more preferably 4 to 15 carbon atoms, or is a cyclic alkyl radical having 5 to 20, preferably 6 to 12 and more preferably 6 to 10 carbon atoms.

Examples of linear alkyl radicals $R^6$ include methyl, ethyl, n-propyl, n-butyl, n-pentyl, n-hexyl, n-heptyl, n-octyl, n-nonyl, n-decyl and n-undecyl radicals, preference being given to n-propyl, n-butyl, n-pentyl, n-hexyl, n-heptyl, n-octyl, n-nonyl and n-decyl radicals, particular preference to ethyl, n-propyl, n-butyl, n-pentyl and n-hexyl radicals and very particular preference to n-butyl radicals. Examples of suitable alkyl (meth)acrylates having a linear alkyl radical are ethyl (meth)acrylate, propyl (meth)acrylate, butyl (meth)acrylate, pentyl (meth)acrylate and hexyl (meth)acrylate.

Branched alkyl radicals $R^6$ may be singly or multiply branched. Examples of branched alkyl radicals $R^6$ include i-butyl, t-butyl, 2,2'-dimethylpropyl, 2-ethylhexyl, 2-propylheptyl, i-nonyl, i-decyl, i-tridecyl, i-heptadecyl radicals, and the alkyl radicals derived from oligomers of propene, n-butene and isobutene, such as tripropenyl, tetrapropenyl, pentapropenyl, tributenyl and tetrabutenyl radicals. Preference is given to t-butyl, 2-ethylhexyl, 2-propylheptyl radicals, and also tetrapropenyl and tributenyl radicals. Examples of suitable alkyl (meth)acrylates having a branched alkyl radical are t-butyl (meth)acrylate, 2-ethylhexyl (meth)acrylate, 2-propylheptyl (meth)acrylate, and also tetrapropenyl (meth)acrylate and tributenyl (meth)acrylate.

Cyclic alkyl radicals $R^6$ may be monocyclic or polycyclic; they are preferably bicyclic. They may also be substituted by linear and/or branched alkyl radicals. Examples of cyclic alkyl radicals $R^6$ include cyclopentyl, cyclohexyl, 4-methylcyclohexyl, cycloheptyl, bicyclo[2.2.1]heptyl, bicyclo[2.2.2]octyl or 2-(1,7,7-trimethylbicyclo[2.2.1]heptyl radicals. Examples of suitable alkyl (meth)acrylates having a cyclic alkyl radical are cyclohexyl (meth)acrylate and bicyclo[2.2.1]heptyl (meth)acrylate.

Further examples of ethylenically unsaturated compounds Aiii) are vinyl esters of carboxylic acids having 1 to 20 carbon atoms, α-olefins having 6 to 40 carbon atoms, vinylaromatics, ethylenically unsaturated dicarboxylic acids and the anhydrides and esters thereof with $C_{10}$-$C_{30}$ fatty alcohols, acrylic acid, methacrylic acid and especially ethylenically unsaturated compounds bearing further functional groups, for example hydroxyethyl acrylate, hydroxypropyl acrylate, hydroxybutyl acrylate, p-acetoxystyrene, benzyl acrylate, vinyl methoxyacetate, dimethylaminoethyl acrylate, perfluoroalkyl acrylate, the isomers of vinylpyridine and derivatives thereof, N-vinylpyrrolidone, and also (meth) acrylamide and derivatives thereof, such as N-alkyl(meth) acrylamides having $C_1$-$C_2O$-alkyl radicals.

Also suitable as further ethylenically unsaturated compounds Aiii) are vinyl and allyl polyglycols of the formula (4)

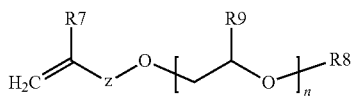 (4)

in which
$R^7$ is hydrogen or methyl,
Z is $C_1$-$C_3$-alkylene or a single bond between the $R^7$-bearing carbon atom and the oxygen atom,
$R^8$ is hydrogen, $C_1$-$C_{30}$-alkyl, cycloalkyl, aryl or —C(O)—$R^{10}$,
$R^9$ is hydrogen or $C_1$-$C_{20}$-alkyl,
$R^{10}$ is $C_1$-$C_{30}$-alkyl, $C_3$-$C_{30}$-alkenyl, cycloalkyl or aryl and m is a number from 1 to 50, preferably 1 to 30.

The term "aryl", unless stated otherwise, is a mono- or bicyclic, carbocyclic aromatic radical.

The term "cycloalkyl", unless stated otherwise, is a cycloalkyl radical having 4 to 8 carbon atoms.

It is also possible in accordance with the invention to use mixtures of multiple different ethylenically unsaturated compounds Aiii). If mixtures of different monomers Aiii) are being used, the total amount thereof is within the range described above for Aiii).

In a preferred embodiment of the invention, the alkyl (meth)acrylates A) contain the monomer Aiii). If alkyl (meth)acrylates Aiii) are present in the alkyl (meth)acrylates A), the individual alkyl (meth)acrylates Ai), Aii) and Aiii) may be present within the ranges of amount preferred in each case.

In the case of presence of an alkyl (meth)acrylate Aiii), the alkyl (meth)acrylates A) contain preferably 20% to 93%, particularly 25% to 85% and especially 30% to 65% by weight, for example 20% to 85% by weight, 20% to 65% by weight, 25% to 93% by weight, 20% to 65% by weight, 30% to 93% by weight or 30% to 85% by weight of Ai).

In the case of presence of an alkyl (meth)acrylate Aiii), the alkyl (meth)acrylates A) contain preferably 5% to 78%, particularly 10% to 65% and especially 15% to 55% by weight, for example 5% to 65% by weight, 5% to 55% by weight, 10% to 78% by weight, 10% to 55% by weight, 15% to 78% by weight or 15% to 65% by weight of Aii).

In the presence of an alkyl (meth)acrylate Aiii), the alkyl (meth)acrylates A) contain preferably 2% to 40%, particularly 5% to 40% and especially 5% to 30% by weight, for example 2% to 30% by weight, of Aiii).

In particularly preferred embodiments, the alkyl (meth) acrylates A) contain 20% to 93% by weight of Ai), 5% to 78% by weight of Aii) and 2% to 40% by weight, especially 5% to 40% by weight, particularly 5% to 30% by weight of Aiii), 20% to 93% by weight of Ai), 10% to 65% by weight of Aii) and 2% to 40% by weight, especially 5% to 40% by weight, particularly 5% to 30% by weight of Aiii), 20% to 93% by weight of Ai), 15% to 55% by weight of Aii) and 2% to 40% by weight, especially 5% to 40% by weight, particularly 5% to 30% by weight of Aiii), 25% to 85% by weight of Ai), 5 to 78% by weight of Aii) and 2% to 40% by weight, especially 5% to 40% by weight, particularly 5% to 30% by weight of Aiii), 25% to 85% by weight of Ai), 10% to 65% by weight of Aii) and 2% to 40% by weight, especially 5% to 40% by weight, particularly 5% to 30% by weight of Aiii), 25% to 85% by weight of Ai), 15% to 55% by weight of Aii) and 2% to 40% by weight, especially 5% to 40% by weight, particularly 5% to 30% by weight of Aiii), 30% to 65% by weight of Ai), 5 to 78% by weight of Aii) and 2% to 40% by weight, especially 5% to 40% by weight, particularly 5% to 30% by weight of Aiii), 30% to 65% by weight of Ai), 10% to 65% by weight of Aii) and 2% to 40% by weight, especially 5% to 40% by weight, particularly 5% to 30% by weight of Aiii) and 30% to 65% by weight of Ai), 15% to 55% by weight of Aii) and 2% to 40% by weight, especially 5% to 40% by weight, particularly 5% to 30% by weight of Aiii).

Suitable copolymers of ethylene and ethylenically unsaturated esters, ethers or alkenes (B) are especially those which contain, as well as ethylene, 4 to 18 mol %, particularly 7 to 15 mol % and especially 8 to 14 mol %, for example 4 to 17 mol %, 4 to 14 mol %, 7 to 18 mol %, 7 to 14 mol %, 8 to 18 mol % or 8 to 15 mol %, of at least one vinyl ester, acrylic ester, methacrylic ester, alkyl vinyl ether and/or alkene. Preferably, the comonomers are vinyl esters, acrylic esters and/or methacrylic esters. Should the ethylene copolymer contain two (terpolymer) or more, for example three (tetrapolymer) or four (pentapolymer), different comonomers, the above-specified molar comonomer contents are based on the sum total of all comonomer contents.

The vinyl esters preferred for the copolymerization with ethylene are those of the formula (6)

 (6)

in which
$R^{11}$ is $C_1$- to $C_{30}$-alkyl, preferably $C_4$- to $C_{16}$-alkyl, especially $C_6$- to $C_{12}$-alkyl.

The alkyl radicals may be linear or branched. In a preferred embodiment they are linear alkyl radicals having 1 to 18 carbon atoms, for example $C_1$- to $C_{16}$-alkyl or $C_1$- to $C_{12}$-alkyl radicals. In a further preferred embodiment, $R^{11}$ is a branched alkyl radical having 3 to 30 carbon atoms and preferably having 5 to 16 carbon atoms, for example having 5 to 30 or 3 to 16 carbon atoms. Particularly preferred vinyl esters derive from secondary and especially tertiary carboxylic acids, the branch of which is in the alpha position to the carbonyl group. Especially preferred here are the vinyl esters of tertiary carboxylic acids that are also referred to as vinyl versatates, which have neoalkyl radicals having 5 to 11 carbon atoms, especially having 8, 9 or 10 carbon atoms. In a further embodiment, the alkyl groups mentioned may have been substituted by one or more hydroxyl groups.

Suitable vinyl esters include vinyl acetate, vinyl propionate, vinyl butyrate, vinyl isobutyrate, vinyl hexanoate, vinyl heptanoate, vinyl octanoate, vinyl pivalate, vinyl 2-ethylhexanoate, vinyl laurate, vinyl stearate, and versatic esters such as vinyl neononanoate, vinyl neodecanoate, vinyl neoundecanoate. An especially preferred vinyl ester is vinyl acetate.

In a further preferred embodiment, the ethylene copolymers B) contain vinyl acetate and at least one further vinyl ester of the formula 6 in which $R^{11}$ is $C_4$- to $C_{30}$-alkyl, preferably $C_4$- to $C_{16}$-alkyl, especially $C_6$- to $C_{12}$-alkyl, for example $C_4$- to $C_{12}$-alkyl. Preferred further vinyl esters are the above-described vinyl esters of this chain length range, for example vinyl butyrate, vinyl isobutyrate, vinyl hexanoate, vinyl heptanoate, vinyl octanoate, vinyl pivalate, vinyl 2-ethylhexanoate, vinyl laurate, vinyl stearate, and versatic esters such as vinyl neononanoate, vinyl neodecanoate, vinyl neoundecanoate.

The acrylic and methacrylic esters preferred for the copolymerization with ethylene are those of the formula (7)

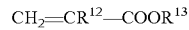 (7)

in which
R$^{12}$ is hydrogen or methyl and
R$^{13}$ is C$_1$- to C$_{30}$-alkyl, preferably C$_4$- to C$_{16}$-alkyl, especially C$_6$- to C$_{12}$-alkyl.

The alkyl radicals R$^{13}$ may be linear or branched. In a preferred embodiment, they are linear. In a further preferred embodiment, they have a branch at the carbon atom adjacent to the ester moiety. Suitable acrylic esters include, for example, methyl (meth)acrylate, ethyl (meth)acrylate, propyl (meth)acrylate, n- and isobutyl (meth)acrylate, hexyl (meth)acrylate, octyl (meth)acrylate, 2-ethylhexyl (meth) acrylate, decyl (meth)acrylate, dodecyl (meth)acrylate, tetradecyl (meth)acrylate, hexadecyl (meth)acrylate, octadecyl (meth)acrylate and mixtures of these comonomers.

The alkyl vinyl ethers preferred for the copolymerization with ethylene are compounds of the formula (8)

$$CH_2=CH-OR^{14} \quad (8)$$

in which
R$^{14}$ is C$_1$- to C$_{30}$-alkyl, preferably C$_4$- to C$_{16}$-alkyl, especially C$_6$- to C$_{12}$-alkyl.

The alkyl radicals R$^{14}$ may be linear or branched. Examples include methyl vinyl ether, ethyl vinyl ether, isobutyl vinyl ether.

The alkenes preferred for the copolymerization with ethylene are monounsaturated hydrocarbons having 3 to 30 carbon atoms, particularly 4 to 16 carbon atoms and especially 5 to 12, for example having 3 to 16 or 3 to 12, carbon atoms. Suitable alkenes include propene, butene, isobutene, pentene, hexene, 4-methylpentene-1, heptene, octene, decene, diisobutylene, and also norbornene and derivatives thereof such as methylnorbornene and vinylnorbornene. Particular preference is given to propene, 4-methylpentene-1 and diisobutylene.

The alkyl radicals R$^{11}$, R$^{13}$ and R$^{14}$ may bear, in minor amounts, functional groups such as amino, amido, nitro, cyano, hydroxyl, keto, carbonyl, carboxyl, ester, sulfo groups and/or halogen atoms, for example, provided that these do not significantly impair the hydrocarbon character of the radicals mentioned. More preferably, the alkyl radicals R$^{11}$, R$^{13}$ and R$^{14}$ independently bear not more than one of the functional groups mentioned. In a particularly preferred embodiment, the alkyl radicals R$^{11}$, R$^{13}$ and R$^{14}$, however, do not bear any basic and especially any nitrogen-containing functional groups.

Particularly preferred terpolymers contain, apart from ethylene, 3 to 15 mol %, particularly 5 to 13 mol %, for example 3 to 13 mol % or 3 to 15 mol %, of vinyl acetate and 0.1 to 12 mol %, particularly 0.2 to 10 mol % and especially 0.5 to 8 mol %, for example 0.1 to 10 mol %, 0.1 to 8 mol %, 0.2 to 12 mol %, 0.2 to 8 mol %, 0.5 to 12 mol % or 0.5 to 10 mol % of at least one long-chain vinyl ester, (meth)acrylic ester and/or alkene (termonomer), where the total comonomer content is between 4 and 18 mol %, preferably between 7 and 15 mol %, for example 4 to 17 mol %, 4 to 14 mol %, 7 to 18 mol %, 7 to 14 mol %, 8 to 18 mol % or 8 to 15 mol %. Particularly preferred termonomers are vinyl 2-ethylhexanoate, vinyl neononanoate, vinyl neodecanoate, 2-ethylhexyl acrylate, 2-propylheptyl acrylate and 4-methyl-2-propylhexyl acrylate.

Further particularly preferred copolymers contain, as well as ethylene and 3 to 15 mol %, particularly 5 to 13 mol %, for example 3 to 13 mol % or 5 to 15 mol %, of vinyl esters, 0.1 to 6 mol %, preferably 0.2 to 5 mol %, for example 0.1 to 5 mol %, or 0.2 to 6 mol % of at least one olefin having 3 to 8 carbon atoms, such as propene, butene, isobutene, hexene, 4-methylpentene, octene, diisobutylene, norbornene and/or styrene.

Examples of suitable terpolymers contain, as well as ethylene, two different vinyl esters, two different alkyl (meth)acrylates, one vinyl ester and one alkyl (meth)acrylate, one vinyl ester and one olefin or one alkyl (meth) acrylate and one olefin.

The number-average molecular weight of the ethylene copolymers B) is preferably between 100 and 100 000 and especially between 250 and 20 000, for example between 100 and 20 000 or between 250 and 100 000 g/mol. The MFI190 values of the ethylene copolymers B) measured according to DIN 53735 at 190° C. and an applied load of 2.16 kg are preferably between 0.1 and 1200 g/10 min and especially between 1 and 900 g/min, for example between 0.1 and 900 g/10 min or between 1 and 1200 g/10 min. The degrees of branching determined by means of $^1$H NMR spectroscopy are preferably between 1 and 9 CH$_3$/100 CH$_2$ groups, particularly between 2 and 6 CH$_3$/100 CH$_2$ groups, for example between 1 and 6 CH$_3$/100 CH$_2$ groups or between 2 and 9 CH$_3$/100 CH$_2$ groups, which do not originate from the comonomers.

Preference is given to using mixtures of two or more of the abovementioned ethylene copolymers. More preferably, the polymers underlying the mixtures differ in at least one characteristic. For example, they may contain different comonomers, different comonomer contents, molecular weights and/or degrees of branching. In preferred mixtures, each individual ethylene copolymer has a proportion by mass of at least 5% by weight, based on the total mass of B).

The copolymers B) are prepared by known methods (in this regard, cf., for example, Ullmanns Encyclopädie der Technischen Chemie [Ullmann's Encyclopedia of Industrial Chemistry], 5$^{th}$ edition, vol. A 21, pages 305 to 413). Suitable methods are polymerization in solution, in suspension and in the gas phase, and high-pressure bulk polymerization. Preference is given to employing high-pressure bulk polymerization, which is conducted at pressures of 50 to 400 MPa, preferably 100 to 300 MPa, and temperatures of 50 to 350° C., preferably 100 to 300° C. The reaction of the comonomers is initiated by free-radical-forming initiators (free-radical chain initiators). This substance class includes, for example, oxygen, hydroperoxides, peroxides and azo compounds, for example cumene hydroperoxide, t-butyl hydroperoxide, dilauroyl peroxide, dibenzoyl peroxide, bis (2-ethylhexyl) peroxydicarbonate, t-butyl permaleate, t-butyl perbenzoate, dicumyl peroxide, t-butyl cumyl peroxide, di(t-butyl) peroxide, 2,2'-azobis(2-methylpropanonitrile), 2,2'-azobis(2-methylbutyronitrile). The initiators are used individually or as a mixture of two or more substances in amounts of 0.01% to 20% by weight, preferably 0.05% to 10% by weight, based on the comonomer mixture. The desired molecular weight, typically measured via the melt flow index MFI (190° C./2.16 kg), of the copolymers B), for a given composition of the comonomer mixture, is established by varying the reaction parameters of pressure and temperature and optionally by addition of moderators. Useful moderators have been found to be hydrogen, saturated or unsaturated hydrocarbons, for example propane and propene, aldehyde, for example propionaldehyde, n-butyraldehyde and isobutyraldehyde, ketones, for example acetone, methyl ethyl ketone, methyl isobutyl ketone and cyclohexanone, or alcohols, for example butanol. Depending on the target viscosity, the moderators are employed in amounts of up to 20% by weight, preferably from 0.05% to 10% by weight, based on the comonomer mixture.

The high-pressure bulk polymerization is conducted batchwise or continuously in known high-pressure reactors, for example autoclaves or tubular reactors; tubular reactors have been found to be particularly useful. Solvents such as aliphatic hydrocarbons or hydrocarbon mixtures, toluene or xylene may be present in the reaction mixture, although the solvent-free mode of operation has been found to be particularly useful. In a preferred embodiment of the polymerization, the mixture of the comonomers, the initiator and, if used, the moderator is fed to a tubular reactor via the reactor inlet and via one or more side branches. In this case, the comonomer streams may be of different composition (EP-B-0 271 738).

The polymer compositions of the invention are obtainable by free-radical copolymerization of the monomers A) in the presence of the ethylene copolymers B). The performance of free-radical polymerizations is known in principle to those skilled in the art.

The free-radical polymerization can be effected, for example, in the form of a bulk polymerization by polymerizing the mixture of the alkyl (meth)acrylates A) with the ethylene copolymer B) by adding a free-radical chain initiator. Owing to the viscosity of the ethylene copolymers, the bulk polymerization is preferably effected at temperatures above the melting point of the ethylene copolymer B), for example above 60° C., especially above 80° C. and particularly between 90 and 150° C.

In a preferred embodiment of the invention, the polymer composition of the invention is prepared by means of free radical polymerization in solution (solution polymerization). Suitable solvents for this purpose are in principle all of those in which the monomers A), the ethylene-vinyl acetate copolymers B) and the polymer composition formed are sufficiently soluble or at least homogeneously dispersed at the temperature envisaged for the polymerization, even in the desired high concentration. In addition, they should not enter into any unwanted reactions in the course of the polymerization. Suitable solvents should especially not be polymerizable themselves and should have a minimum moderating/chain-transferring effect under the polymerization conditions chosen.

In the solution polymerization, the amount of solvent is typically 0.1 to 10 times, preferably 0.5 to 5 times, the total amount of A) and B). More preferably, the proportion of the solvent in the total amount of A), B) and solvent and of any further auxiliaries present is between 35% and 80% by weight and especially between 40% and 70% by weight, for example between 35% and 70% by weight or between 40% and 80% by weight.

Preferably, the solvents suitable for the solution polymerization are hydrocarbons, preferably aliphatic, cycloaliphatic and/or aromatic hydrocarbons and mixtures thereof. Examples of suitable solvents are toluene, xylene, higher aromatics and higher-boiling aromatic mixtures and/or isoaliphatic solvents or solvent mixtures. In the solution polymerization, a ready-to-use, solvent-containing polymer composition is obtained, which can be used as pour point depressant directly or else after dilution with further solvent, without requiring further workup steps after the polymerization.

For the solution polymerization, in a preferred embodiment, a solution of the alkyl (meth)acrylates Ai), Aii) used and optionally further monomers Aiii) and of the copolymer (B) in the solvent chosen is first prepared. The dissolution is effected by vigorously mixing the components, for example by stirring. For example, the monomers (A) can first be dissolved and then solid ethylene-vinyl ester copolymer (B) can be added to the solution, or ethylene-vinyl ester copolymer (B) can first be dissolved and the monomers (A) can be added. The dissolution can be accelerated by an increase in the temperature, for example to about 50 to 80° C.

In a particularly preferred embodiment, a solution of the alkyl (meth)acrylates Ai) and Aii) and optionally further monomers Aiii) in a solvent as described above which is also suitable for the later polymerization is prepared by esterifying (meth)acrylic acid with alcohols of the formula $R^3$—OH and $R^4R^5CH$—$CH_2$—OH in this solvent and using the solution obtained, after mixing with the ethylene copolymer B), for the polymerization. The esterification can be conducted by methods known in principle to the person skilled in the art. Ester monomers of the formula (3) can be prepared together with the monomers Ai) and Aii) and optionally further monomers Aiii) by esterifying an alcohol of the formula $R^6$—OH with (meth)acrylic acid together with the alcohols of the formulae $R^3$—OH and $R^4R^5CH$—$CH_2$—OH. They can also be prepared separately and then added to the polymerization mixture.

In a further particularly preferred embodiment, the preparation of the alkyl (meth)acrylates Ai) and Aii) and optionally further monomers Aiii) and the subsequent polymerization thereof in the presence of the ethylene copolymer B) are effected in an aliphatic hydrocarbon or hydrocarbon mixture with a low moderating effect, for example an isoparaffinic solvent or solvent mixture having an initial boiling point above 150° C. and especially above 180° C. and a flashpoint of at least 60° C. Transport and storage of the polymer compositions are thus simplified.

The free-radical polymerization is effected using thermally decomposing initiators for the free-radical polymerization. Even though typically just one initiator is used, it has been found to be useful in various cases to use a mixture of two or more different initiators, for example with different half-lives. Preference is given to choosing the initiators used such that they are soluble in the polymerization medium. Preferred polymerization initiators include oil-soluble peroxides and azo compounds, particularly those having a 10 h half life of less than 70° C. and preferably less than 50° C. Initiators of this kind are known in principle and commercially available. Based on the monomers A), they are preferably used in amounts of 0.1% to 2.0% by weight, for example in amounts of 0.2% to 1.5% by weight.

In addition, in a manner known in principle, molecular weight regulators may be added. Examples of regulators include alcohols such as isopropanol, allyl alcohol or buten-2-ol, thiols such as ethanethiol or dodecanethiol, or aldehydes such as crotonaldehyde. The amount of the molecular weight regulators is generally 1% to 4% by weight, preferably 1.5% to 3% by weight, based on the total amount of the monomers A).

The free-radical polymerization is triggered in a manner known in principle by heating the reaction mixture. The polymerization temperature should be above the 10 h half-life of the initiator and is generally at least 50° C. A particularly useful polymerization temperature has been found to be 50 to 120° C., especially 55 to 100° C. In general, the polymerization is undertaken in a manner known in principle under a protective gas, for example nitrogen. The polymerization in solution can be undertaken using an initial charge of the solution of the starting materials in a suitable, preferably stirred reaction vessel. If desired, one or more molecular weight regulators are added to the solution. After the desired polymerization temperature has been attained, a solution of the initiator is added to the mixture to be polymerized. It is possible here to add the total amount of the initiator at the start of the polymerization, but preference is given to adding the initiator over a period of 10 minutes to 5 hours, preferably 30 minutes to 2 hours. The addition can be effected in defined portions or continuously. The complete addition of the initiator should generally be followed by a period for further polymerization. This may be, for example, 0.5 to 5 h.

The ratio of monomers A) to ethylene-vinyl ester copolymers B) is chosen according to the desired properties of the polymer composition to be synthesized, where the proportion of the monomers A) is 40% to 95% by weight, preferably 50% to 90% by weight, more preferably 60% to 80% by weight, for example 40% to 90% by weight, 40% to 80% by weight, 50% to 95% by weight, 50% to 80% by weight, 60% to 95% by weight or 60% to 90% by weight, and the amount of ethylene copolymers B) is 5% to 60% by weight, preferably 10% to 50% by weight and more preferably 20% to 40% by weight, for example 50% to 50% by weight, 5% to 40% by weight, 10% to 60% by weight, 10% to 40% by weight, 20% to 60% by weight or 20% to 50% by weight, based in each case on the sum total of alkyl (meth)acrylates A) and ethylene-vinyl ester copolymers B). In a specific embodiment, the amounts of A) and B) add up to 100% by weight. The above-specified amounts of A and B that give rise to the composition of the invention are in bulk, i.e. without solvent.

The polymer compositions of the invention are especially suitable for improving the cold properties of crude oils and paraffin-containing products produced therefrom, for example middle distillates, heating oils, bunker oils and residue oils. They have a particularly advantageous effect on crude oils and residue oils. They modify the structure of the paraffins that precipitate out at low temperatures, which lowers the pour point of the crude oils and also of the products produced therefrom. For this purpose, the polymer compositions of the invention are added to the crude oil to be treated or to the paraffin-containing products derived therefrom. The polymers of the invention can of course also be used for other purposes.

The use of the polymer compositions as mineral oil additive is effected by adding at least one of the polymer compositions to the crude oil or to the paraffin-containing product produced therefrom. Customary added amounts are 10 to 10 000 ppm by weight, preferably 50 to 2000 ppm by weight, for example 10 to 2000 ppm by weight, or 50 to 10 000 ppm by weight of the polymer composition.

For the use of the invention, the polymer composition can be used as such. Advantageously, the polymer compositions of the invention are used as concentrates in organic solvents. As well as the concentrate obtained directly in the solution polymerization, the polymer composition may also be weakened with further solvent after it has been produced. In this case, the polymer composition should be in homogeneously dispersed, preferably dissolved form. Suitable solvents in principle are all of those that meet these requirements. It is also possible to use mixtures of different solvents.

Preferred solvents for the production of concentrates of the polymer compositions of the invention are, as well as the above-described solvents usable for the solution polymerization, especially aliphatic, cycloaliphatic and/or aromatic hydrocarbons and hydrocarbon mixtures. Especially preferred solvents are those having a flashpoint above 60° C., since fewer restrictions have to be observed for transport and storage of the concentrates when such solvents are used.

Suitable solvents or solvent mixtures are, for example, saturated aliphatic hydrocarbons. These may be either paraffinic or naphthenic, i.e. saturated cyclic, hydrocarbons. Preference is given to high-boiling aliphatic hydrocarbons having a boiling point of at least 175° C. and preferably a flashpoint above 60° C. Suitable hydrocarbons having a flashpoint above 60° C. include, for example, n-undecane (flashpoint 60° C., boiling point 196° C.) or n-dodecane (flashpoint 71° C., boiling point 216° C.). Preference is given to using technical grade mixtures of hydrocarbons, for example mixtures of paraffinic hydrocarbons, mixtures of paraffinic and naphthenic hydrocarbons, or mixtures of isoparaffins. It will be clear to the person skilled in the art that technical grade mixtures may also contain minor proportions of aromatic or unsaturated hydrocarbons. The content of aromatic and/or unsaturated hydrocarbons is preferably below 20% by weight, often below 10% by weight and in some cases below 1% by weight. Technical grade mixtures of saturated aliphatic solvents are commercially available, for example technical grade mixtures from the Shellsol® D series, the Isopar® series or the Exxsol® D series. Kerosene is also suitable as aliphatic hydrocarbon mixture.

The hydrocarbons suitable for production of concentrates may also be aromatic solvents or solvent mixtures. In one embodiment of the invention, they are high-boiling aromatic hydrocarbons having a boiling point of at least 175° C. and preferably a flashpoint above 60° C. Suitable aromatic hydrocarbons having a flashpoint above 60° C. include, for example, alkylated aromatics and naphthalene. Preference is given to using technical grade mixtures of aromatic hydrocarbons. Technical grade mixtures of aromatic hydrocarbons are commercially available, for example technical grade mixtures from the Shellsol® A series or the Solvesso® series.

Further examples of suitable solvents are saturated aliphatic hydrocarbons, saturated aliphatic alcohols and esters of saturated aliphatic carboxylic acids and saturated aliphatic alcohols. Examples of suitable alcohols include aliphatic alcohols having at least eight carbon atoms such as 1-octanol, 2-ethylhexanol, 1-decanol, 1-dodecanol and isotridecanol. Examples of suitable esters include esters of saturated fatty acids having at least eight carbon atoms with saturated aliphatic alcohols, for example methyl laurate or methyl stearate. Technical grade mixtures of different aliphatic esters are commercially available. In a further embodiment of the invention, it is possible to use esters of aliphatic or cycloaliphatic dicarboxylic acids, for example dialkyl esters of cyclohexane-1,2-dicarboxylic acid such as diisononyl cyclohexane-1,2-dicarboxylate. Particularly preferred solvents have a flashpoint above 60° C.

The concentration of the polymer composition in the concentrate is chosen by the person skilled in the art according to the desired properties of the formulation to be produced. Preferred concentrates have a content of polymer composition of the invention of 20% to 60% by weight, more preferably 25% to 50% by weight and especially 25% to 40% by weight, for example 20% to 50% by weight, 20% to 40% by weight or 25% to 60% by weight, based on the sum total of polymer composition and the solvent used. Formulations of this kind feature a very low intrinsic pour point and hence simplified handling at low storage and transport temperatures. Suitable concentrates can be produced directly by means of the abovementioned method of solution polymerization. It has often been found to be useful to conduct the polymerization in solvent-free form or to conduct the solution polymerization at a higher concentration and then to dilute with further solvent, preferably with the above-described aliphatic and/or aromatic hydrocarbons.

It is also possible to formulate the polymer compositions of the invention together with further active ingredients for the same or other purposes.

The branched alcohols Aii) impart surprisingly low intrinsic pour points to the polymer compositions of the invention and especially the concentrates thereof, without excessively impairing efficacy as a pour point depressant, as was to be expected according to the teaching of WO 2010/003892. This allows use thereof at low temperatures as well, for example below 10° C., often below 5° C. and in some cases below 0° C., without heating of reservoir vessels and/or conduits. The liquid concentrates of low viscosity also remain homogeneous over prolonged periods, for example over several days to several weeks, meaning that no phase separation or gelation which is typical of mixtures of poly (alkyl (meth)acrylates) and ethylene copolymers takes place. This is probably attributable to at least partial grafting of the alkyl (meth)acrylates Ai) and Aii) onto the ethylene copolymer B).

The polymer compositions of the invention and especially the concentrates thereof in hydrocarbons, in spite of a high active ingredient content of up to 50% by weight, are liquids of low viscosity. Their viscosities at 20° C. are below 1 Pas. Their intrinsic pour point is typically below 10° C., often even below 0° C., for example below −10° C. They can thus be used even under unfavorable climatic conditions, for example in Arctic regions and also in offshore applications without further precautions against the solidification of the additives. Application down-the-hole is also possible without prior dilution of the additives and without heating of the conveying lines. Furthermore, they also show excellent long-term stability at elevated temperatures above 30° C., for example above 45° C., meaning that the suspensions of the invention even after storage for several weeks and in some cases several months show only negligible amounts of coagulate or separated-out solvent, if any. Any inhomogeneities that occur can additionally be homogenized again by simply stirring them up.

As well as the use of the polymer compositions of the invention as such or as concentrate, they can also be formulated with further components. For example, it is possible to add to the formulation additional wax dispersants that differ in their chemical nature from the polymer compositions of the invention, which stabilize paraffin crystals formed and prevent them from sedimenting. Wax dispersants used may, for example, be alkylphenols, alkylphenol-formaldehyde resins and/or dodecylbenzenesulfonic acid. In addition, the polymer compositions of the invention can be used together with asphaltene dispersants, which prevent precipitation of polycyclic hydrocarbons.

Within the scope claimed, the polymer compositions exhibit both a low intrinsic pour point and very good lowering of the pour point of paraffin-containing mineral oils. This was not to be expected especially in view of the teaching of WO 2010/003892, since the branched alcohols therein do not show any application-related efficacy.

EXAMPLES

Preparation of the Polymers

The polymer compositions of the invention, and also the comparative examples, were prepared by esterifying a mixture of linear alcohol and branched alcohol with acrylic acid and/or methacrylic acid in xylene with azeotropic removal of water of reaction. Subsequently, the EVA copolymer was dissolved in the acrylate with addition of further solvent (xylene), so as to form a solution of 60% strength by weight overall. Inertization with nitrogen was followed by free-radical polymerization with 2,2'-azobis-2-methylbutyronitrile (AMBN) at 80° C. Table 1 lists the raw materials used for the production of the various polymer compositions.

TABLE 1

Raw materials used for the production of the polymer compositions

| | |
|---|---|
| EVA 1 | Ethylene-vinyl acetate copolymer of 72% by weight of ethylene and 28% by weight of vinyl acetate; melt flow index MFI (@190° C./2.16 kg) of 8 g/10 min. |
| EVA 2 | Ethylene-vinyl acetate copolymer of 81% by weight of ethylene and 19% by weight of vinyl acetate; melt flow index MFI (@190° C./2.16 kg) of 12 g/10 min. |
| EVA 3 | Terpolymer of 69% by weight of ethylene; 16% by weight of vinyl acetate and 15% by weight of 2-ethylhexyl acrylate; melt flow index MFI (@190° C./2.16 kg) of 32 g/10 min. |
| BA 1 | Behenyl acrylate: technical grade mixture of 39% by weight of $C_{18}$-, 13% by weight of $C_{20}$- and 48% by weight of $C_{22}$-acrylates with a linear alkyl radical |
| BA 2 | Behenyl acrylate: technical grade mixture of 43% by weight of $C_{18}$-, 11% by weight of $C_{20}$- and 44% by weight of $C_{22}$-acrylates with a linear alkyl radical |
| BA 3 | Behenyl methacrylate: technical grade mixture of 48% by weight of $C_{18}$-, 9% by weight of $C_{20}$- and 43% by weight of $C_{22}$-acrylates with a linear alkyl radical |
| GA 1 | 2-Dodecylhexadecyl acrylate |
| GA 2 | 2-Octyldodecyl acrylate |
| GA 3 | 2-Tetradecyloctadecyl acrylate |
| tBA | tert-Butyl acrylate |
| IDTA | Isotridecyl acrylate |
| OA | Oleyl acrylate |
| 2-EHA | 2-Ethylhexyl acrylate |

Example 1: Preparation of a Copolymer of Behenyl Acrylate and 2-Dodecyl-Hexadecyl Acrylate (1:1) in the Presence of EVA 1

In a polymerization vessel with Teflon stirrer, jacketed coil condenser, thermometer, gas inlet tube and dropping funnel, 182.9 g of behenyl acrylate (BA 1) and 237.7 g of 2-dodecylhexadecyl acrylate (GA 1) were dissolved in 188 g of xylene at 90° C. While stirring, 141.6 g of the ethylene-vinyl acetate copolymer EVA 1 and a further 108.1 g of xylene were added until there was a homogeneous solution. At 70° C., 1.78 g of the 2,2'-azobis(2-methylbutyronitrile) initiator (Peroxan AIVN) dissolved in 80.0 g of xylene were metered in over the course of 1 hour. After a further 4 hours of reaction time at 70° C., the mixture was stirred at 90° C. for a further hour to destroy initiator residues.

The solution obtained had a concentration of 60% by weight of the polymer composition. To assess the flowability, the reaction product was diluted with Solvent Naphtha, a high-boiling aromatic hydrocarbon mixture having a boiling range from 185 to 215° C., to a polymer content of 35% by weight and homogenized at 90° C. At this dilution, the dynamic viscosity was determined at 40° C. to DIN ISO 3219 and the intrinsic pour point of the product to DIN ISO 3016. The values ascertained are reported in table 2.

The further examples and comparative examples were conducted according to the same method with the raw materials and ratios listed in table 2. Unless stated otherwise, percentages are based on parts by weight.

TABLE 2

Characterization of the polymer compositions used

| Polymer | EVA (B) [% by wt.] | Total acrylate [% by wt.] | Acrylate, composition linear (Ai) [mol %] | 2-branched (Aii) [mol %] | others (Aiii) [mol %] | Visc.@40° C. [mPas] | Pour point [° C.] |
|---|---|---|---|---|---|---|---|
| P1 | 25% EVA1 | 75% | 50% BA 1 | 50% GA1 | — | 167 | −9 |
| P2 | 25% EVA1 | 75% | 70% BA 1 | 30% GA1 | — | 207 | 6 |
| P3 | 25% EVA1 | 75% | 90% BA 1 | 10% GA1 | — | 288 | 21 |
| P4 | 25% EVA1 | 75% | 25% BA 1 | 75% GA1 | — | 131 | −27 |
| P5 | 25% EVA1 | 75% | 50% BA 1 | 50% GA2 | — | 172 | −6 |
| P6 | 25% EVA1 | 75% | 50% BA 1 | 50% GA3 | — | 161 | −3 |
| P7 | 25% EVA1 | 75% | 50% BA 1 | 25% GA1 | 25% OA | 169 | −6 |
| P8 | 25% EVA1 | 75% | 50% BA 1 | 25% GA1 | 25% ITDA | 167 | −3 |
| P9 | 25% EVA1 | 75% | 45% BA 1 | 25% GA1 | 30% ITDA | 158 | −9 |
| P10 | 25% EVA1 | 75% | 50% BA 1 | 25% GA1 | 25% tBA | 145 | −3 |
| P11 | 20% EVA1 | 80% | 45% BA 1 | 25% GA 1 | 30% ITDA | 125 | −6 |
| P12 | 25% EVA1 | 75% | 34% BA 2 | 33% GA 1 | 33% OA | 99 | −18 |
| P13 | 25% EVA1 | 75% | 50% BA 2 | 25% GA 1 | 25% OA | 124 | −6 |
| P14 | 25% EVA1 | 75% | 50% BA 2 | 25% GA 1 | 25% ITDA | 112 | −6 |
| P15 | 25% EVA1 | 75% | 45% BA 2 | 25% GA 1 | 30% ITDA | 227 | −9 |
| P16 | 35% EVA1 | 65% | 50% BA 2 | 25% GA 1 | 25% OA | 391 | 0 |
| P17 | 25% EVA1 | 75% | 45% BA 2 | 25% GA 1 | 30% ITDA | 187 | −12 |
| P18 | 25% EVA1 | 75% | 50% BA 2 | 50% GA 1 | — | 157 | −9 |
| P19 | 25% EVA1 | 75% | 50% BA 3 | 50% GA3 | — | 620 | −12 |
| P20 | 25% EVA2 | 75% | 50% BA 1 | 50% GA 1 | | 234 | −3 |
| P21 | 20% EVA3 | 80% | 50% BA 3 | 50% GA3 | | 187 | −9 |
| Comp. 1 | 25% EVA1 | 75% | 100% BA 1 | — | — | 206 | 24 |
| Comp. 2 | 20% EVA1 | 80% | 100% BA 2 | — | — | 132 | 27 |
| Comp. 3 | 25% EVA1 | 75% | 50% BA 1 | — | 50% tBA | 106 | −6 |
| Comp. 4 | 20% EVA1 | 80% | 45% BA 1 | — | 55% ITDA | 118 | −12 |
| Comp. 5 | 25% EVA1 | 75% | 70% BA 1 | — | 30% 2-EHA | 232 | 12 |
| Comp. 6 | 25% EVA1 | 75% | 100% BA 3 | — | — | 666 | 0 |
| Comp. 7 | 25% EVA1 | 75% | — | 100% GA1 | — | 94 | −39 |

For the determination of the efficacy thereof, the polymer compositions were added to crude oils or residue oils and the pour point depression achieved as a result (pour point according to ASTM D97) in the oil was determined. The test oils O1, O2 and O4 were crude oils of West African provenance, and O3 was a crude oil of North African provenance. Test oil 5 was a residue from crude oil distillation. The characterization of the crude oils used is reported in table 3. The composition of oils was undertaken by means of SARA analysis according to IP 469-01. This involved determining the proportions in the crude oils of saturated hydrocarbons (Sat.), aromatics (Arom.), resins (Res.) and asphaltenes (Asph.). The wax appearance temperature (WAT) was determined by means of dynamic differential calorimetry (DSC). The starting temperature for the measurements was chosen such that it was at least 10° C. above the WAT. The samples were cooled at a cooling rate of −2.5 K/min. The commencement of exothermic paraffin crystallization is shown by the WAT. The pour point depressions achieved in the crude oils O1 to O4 are shown in tables 4 to 7.

TABLE 3

Characterization of test oils O1 to O5

| Test oil | Pour Point (blank) [° C.] | SARA analysis Sat. [%] | Arom. [%] | Res. [%] | Asph. [%] | WAT [° C.] |
|---|---|---|---|---|---|---|
| O1 | 15 | 53 | 22 | 24 | 1 | 30 |
| O2 | 15 | 50 | 24 | 25 | 1 | 24 |
| O3 | 30 | 71 | 18 | 5 | 6 | 36 |
| O4 | 12 | 60 | 29 | 10 | 1 | 20 |
| O5 | 18 | 29 | 50 | 13 | 8 | 16 |

TABLE 4

Pour point depression in test oil O1; blank PP + 15° C.

| Example | Polymer | 100 ppm |
|---|---|---|
| 1 | P1 | −3 |
| 2 | P2 | −6 |
| 3 | P3 | −6 |
| 4 | P4 | 9 |
| 5 | P5 | 0 |
| 6 | P6 | −6 |
| 7 | P7 | 0 |
| 8 | P8 | −3 |
| 9 | P9 | −3 |
| 10 | P10 | −3 |
| 11 | P11 | 6 |
| 12 | P12 | 9 |
| 13 | P13 | 6 |
| 14 | P14 | 0 |
| 15 | P15 | 0 |
| 16 | P16 | −3 |
| 17 | P17 | 0 |
| 18 | P18 | 0 |
| 19 | P19 | −6 |
| 20 (C) | Comp. 1 | −6 |
| 21 (C) | Comp. 2 | −3 |

TABLE 4-continued

Pour point depression in test oil O1; blank PP + 15° C.

| Example | Polymer | 100 ppm |
|---|---|---|
| 22 (C) | Comp. 3 | 6 |
| 23 (C) | Comp. 4 | 6 |
| 24 (C) | Comp. 5 | 0 |
| 25 (C) | Comp. 6 | -6 |
| 26 (C) | Comp. 7 | 15 |

TABLE 5

Pour point depression in test oil O2; blank PP + 15

| Example | Polymer | 100 ppm |
|---|---|---|
| 27 | P1 | -15 |
| 28 | P2 | -18 |
| 29 | P3 | -12 |
| 30 | P4 | -6 |
| 31 | P5 | -15 |
| 32 | P6 | -15 |
| 33 | P9 | -18 |
| 34 | P13 | -15 |
| 35 | P14 | -12 |
| 36 | P15 | -12 |
| 37 | P16 | -21 |
| 38 | P17 | -15 |
| 39 | P18 | -18 |
| 40 | P19 | -18 |
| 41 | P20 | -18 |
| 42 (C) | Comp. 1 | -24 |
| 43 (C) | Comp. 2 | -21 |
| 44 (C) | Comp. 6 | -21 |

TABLE 6

Pour point depression in test oil O3; blank PP + 30

| Example | Polymer | 1000 ppm |
|---|---|---|
| 45 | P1 | 15 |
| 46 | P5 | 12 |
| 47 | P8 | 18 |
| 48 | P11 | 15 |
| 49 | P12 | 15 |
| 50 | P13 | 18 |
| 51 | P14 | 12 |
| 52 | P18 | 12 |
| 53 | P20 | 18 |
| 54 (C) | Comp. 1 | 15 |
| 55 (C) | Comp. 2 | 9 |
| 56 (C) | Comp. 3 | 21 |
| 57 (C) | Comp. 7 | 27 |

TABLE 7

Pour point depression in test oil O4; blank PP + 12

| Example | Polymer | 100 ppm | 200 ppm |
|---|---|---|---|
| 58 | P1 | 3 | -6 |
| 59 | P2 | 0 | -12 |
| 60 | P3 | -3 | -15 |
| 61 | P4 | 9 | 3 |
| 62 | P5 | 6 | 0 |
| 63 | P6 | 0 | -12 |
| 64 | P10 | 0 | -12 |
| 65 | P13 | -9 | -12 |
| 66 | P15 | 3 | -6 |
| 67 | P16 | -3 | -9 |
| 68 | P17 | 9 | 3 |
| 69 | P18 | 9 | 0 |
| 70 | P19 | 6 | -6 |
| 71 | P21 | 3 | -9 |
| 72 (C) | Comp. 1 | -9 | -15 |
| 73 (C) | Comp. 2 | -6 | -15 |
| 74 (C) | Comp. 3 | 9 | 6 |
| 75 (C) | Comp. 5 | 3 | -3 |
| 76 (C) | Comp. 6 | 6 | -3 |
| 77 (C) | Comp. 7 | 9 | 9 |

TABLE 8

Pour point depression in refinery residue O5; blank PP + 18

| Example | Polymer | 1500 ppm |
|---|---|---|
| 78 | P1 | -9 |
| 79 | P2 | 0 |
| 80 | P3 | -3 |
| 81 | P4 | 3 |
| 82 | P5 | -6 |
| 83 | P6 | 0 |
| 84 | P7 | 6 |
| 85 | P8 | 3 |
| 86 | P9 | -9 |
| 87 | P11 | -3 |
| 88 | P12 | 3 |
| 89 | P14 | -6 |
| 90 | P15 | -6 |
| 91 | P16 | 9 |
| 92 | P17 | -9 |
| 93 | P18 | -12 |
| 94 | P21 | -9 |
| 95 (C) | Comp. 1 | -3 |
| 96 (C) | Comp. 2 | -6 |
| 97 (C) | Comp. 4 | -3 |

To assess the flowability of concentrates of the novel polymer compositions during prolonged storage at low temperatures, the polymer compositions were dissolved at 50° C. in Solvent Naphtha (high-boiling aromatics mixture with boiling range of 185-215° C.) with a polymer content of 35% by weight and left to cool gradually to room temperature. After storage of a 100 ml sample at room temperature for 15 hours, flowability was tested in analogy to ASTM D79 by tilting the sample vessel. Movement of the surface on tilting of the sample bottle showed that the sample was free-flowing and was recorded as "OK"; the presence of gel structures was additionally recorded as "gel". The products were then stored at 0° C. in a climate-controlled cabinet. The first assessment of flowability was made after storage at 0° C. for 6 hours; the assessment of the long-term flowability/pumpability was made after storage at 0° C. for a further 10 days by the same testing and assessment principles. In the assessment of flowability, possible gel formation/inhomogeneity was additionally tested.

TABLE 9

Assessment of storage stability and flowability

| Example | Polymer | Flowability at RT | Flowability at 0° C., storage for 6 h | Flowability at 0° C., storage for 10 days |
|---|---|---|---|---|
| 98 | P1 | OK | OK | OK |
| 99 | P2 | OK | solid | solid |

TABLE 9-continued

Assessment of storage stability and flowability

| Example | Polymer | Flowability at RT | Flowability at 0° C., storage for 6 h | Flowability at 0° C., storage for 10 days |
|---|---|---|---|---|
| 100 | P3 | OK | solid | solid |
| 101 | P4 | OK | OK | OK |
| 102 | P5 | OK | OK | OK |
| 103 | P5 | OK | OK | OK |
| 104 | P6 | OK | OK | OK |
| 105 | P7 | OK | OK | OK |
| 106 | P8 | OK | OK | OK |
| 107 | P9 | OK | OK | OK |
| 108 | P10 | OK | OK | OK |
| 109 | P11 | OK | OK | OK |
| 110 | P19 | OK | OK | OK |
| 111 | P20 | OK | OK | OK |
| 112 | P21 | OK | OK | OK |
| 113 (C) | Comp. 1 | free-flowing/gel | solid | solid |
| 114 (C) | Comp. 2 | solid | solid | solid |
| 115 (C) | Comp. 3 | OK | OK | viscous/gel |
| 116 (C) | Comp. 4 | OK | solid | solid |
| 117 (C) | Comp. 5 | OK | solid | solid |
| 118 (C) | Comp. 6 | OK | viscous/gel | solid |

The additives of the invention, in the form of concentrates, have very good flowability at low temperatures and simultaneously superior efficacy on the pour point of crude oils. The short-chain or branched alkyl acrylates of WO 2014/095412 that were proposed in a similar context lower the intrinsic pour point of the additives only slightly, but are not capable of cocrystallization with the paraffins that precipitate out of the oil to be additized and hence attenuate the efficacy of the additives to a greater degree.

The invention claimed is:

1. A polymer composition prepared by free-radical polymerization of
   A) 95-40% by weight of alkyl (meth)acrylate comprising
      Ai) 20-95% by weight of at least one alkyl (meth)acrylate having 16 to 40 carbon atoms in the alkyl radical and
      Aii) 5-80% by weight of at least one (meth)acrylic ester of a $C_5$-$C_{22}$ alcohol having a $C_6$-$C_{20}$-alkyl radical in the 2 position to the hydroxyl group, where Ai) and Aii) are different than one another, in the presence of
   B) 5-60% by weight of an ethylene copolymer.

2. The polymer composition as claimed in claim 1, wherein the alkyl (meth)acrylates Ai) are according to the general formula (1)

$$H_2C=C(R^2)-COOR^3 \quad (1)$$

where
$R^2$ is hydrogen or a methyl group,
$R^3$ is a linear alkyl radical having 16 to 40 carbon atoms.

3. The polymer composition as claimed in claim 1, wherein the alkyl (meth)acrylates Aii) are according to the general formula (2)

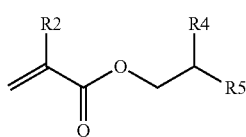

(2)

where
$R^2$ is hydrogen or a methyl group,
$R^4$ and $R^5$ are independently a saturated linear alkyl radical having 6 to 20 carbon atoms and the sum total of the carbon atoms in $R^4$ and $R^5$ is between 16 and 40.

4. The polymer composition as claimed in claim 1, wherein the alkyl (meth)acrylate A) contains 25% to 90% by weight, of at least one alkyl (meth)acrylate Ai) based on the total weight of A).

5. The polymer composition as claimed in claim 1, wherein the alkyl (meth)acrylate A) contains 10% to 60% by weight, of at least one alkyl (meth)acrylate Aii) based on the total weight of A).

6. The polymer composition as claimed in claim 1, wherein the alkyl (meth)acrylate A) contains up to 40% by weight of one or more further monomers Aiii).

7. The polymer composition as claimed in claim 6, wherein the further monomers Aiii) are selected from the group consisting of vinyl esters of carboxylic acids having 1 to 20 carbon atoms, α-olefins having 6 to 40 carbon atoms, vinylaromatics, ethylenically unsaturated dicarboxylic acids and the anhydrides and esters thereof with $C_{10}$-$C_{30}$ fatty alcohols, acrylic acid, methacrylic acid, ethylenically unsaturated compounds beating further functional groups, and vinyl and allyl polyglycols.

8. The polymer composition as claimed in claim 6, wherein the further monomers Aiii) according to the formula (3)

$$H_2C=C(R^2)-COOR^6 \quad (3)$$

where
$R^2$ is hydrogen or a methyl group,
$R^6$ is a linear alkyl radical having 1 to 11 carbon atoms, is a branched alkyl radical having 4 to 17 carbon atoms or is a cyclic alkyl radical having 5 to 20 carbon atoms.

9. The polymer composition as claimed in claim 6, wherein the further monomers Aiii) are vinyl or allyl polyglycols of the formula (4)

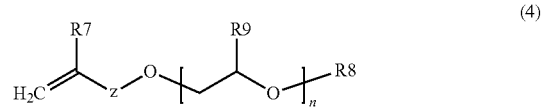

(4)

in which
$R^7$ is hydrogen or methyl,
Z is $C_1$-$C_3$-alkylene or a single bond between the $R^7$-bearing carbon atom and the oxygen atom,
$R^8$ is hydrogen, $C_1$-$C_{30}$-alkyl, cycloalkyl, aryl or —C(O)—$R^{10}$,
$R^9$ is hydrogen or $C_1$-$C_{20}$-alkyl,
$R^{10}$ is $C_1$-$C_{30}$-alkyl, $C_3$-$C_{30}$-alkenyl, cycloalkyl or aryl and
m is a number from 1 to 50.

10. The polymer composition as claimed in claim 1, wherein the ethylene copolymer contains, as well as ethylene, 4 to 18 mol % of at least one vinyl ester, acrylic ester, methacrylic ester, alkyl vinyl ether and/or alkene.

11. The polymer composition as claimed in claim 1, wherein the ethylene copolymer is a copolymer of ethylene and the vinyl ester of a $C_1$-$C_{24}$ carboxylic acid, a $C_1$-$C_{22}$-alkyl (meth)acrylate and/or a $C_3$-$C_{24}$ olefin.

12. The polymer composition as claimed in claim 1, wherein the ethylene copolymer is a copolymer of ethylene and at least one vinyl ester of the formula (6)

$$CH_2=CH-OCOR^{11} \quad (6)$$

in which

R$^{11}$ is C$_1$- to C$_{30}$-alkyl.

13. The polymer composition as claimed in claim 1, wherein the ethylene copolymer contains vinyl acetate as comonomer.

14. The polymer composition as claimed in claim 1, wherein the ethylene copolymer is a copolymer of ethylene and at least one acrylic or methacrylic ester of the formula (7)

$$CH_2=CR^{12}-COOR^{13} \qquad (7)$$

in which

R$^{12}$ is hydrogen or methyl and

R$^{13}$ is C$_1$- to C$_{30}$-alkyl.

15. The polymer composition as claimed in claim 1, wherein the ethylene copolymer has an MFI190 value measured according to DIN 53735 at 190° C. and an applied load of 2.16 kg of between 0.1 and 1200 g/10 min.

16. The polymer composition as claimed in claim 1, prepared by free-radical polymerization of A and B in the presence of a solvent, where the proportion thereof in the total amount of A, B and solvent and of any further auxiliaries is between 35% and 80% by weight.

17. The polymer composition as claimed in claim 6, in which the alkyl (meth)acrylates A) contain 20% to 93% by weight of monomers Ai).

18. The polymer composition as claimed in claim 6, in which the alkyl (meth)acrylates A) contain 5% to 78% by weight of monomers Aii).

19. The polymer composition as claimed in claim 6, in which the alkyl (meth)acrylates A) contain 2% to 40% by weight of monomers Aiii).

20. A process for preparing a polymer composition in which a mixture of
A) 95-40% by weight of alkyl (meth)acrylate (A) comprising
  Ai) 20-95% by weight of at least one alkyl (meth)acrylate having 16 to 40 carbon atoms in the alkyl radical and
  Aii) 5-80% by weight of at least one (meth)acrylic ester of a C$_5$-C$_{22}$ alcohol having a C$_6$-C$_{20}$-alkyl radical in the 2 position to the hydroxyl group, where Ai) and Aii) are different than one another, in the presence of
B) 5-60% by weight of an ethylene copolymer, is copolymerized by adding a free-radical chain initiator.

21. The process as claimed in claim 20, in which the polymerization is conducted in the presence of 0.1 to 10 times the amount of solvent based on the amount of A) and B).

22. The process as claimed in claim 20, in which the solvent is an aliphatic hydrocarbon or an aliphatic hydrocarbon mixture having a flashpoint of at least 60° C.

23. A concentrate comprising 10% to 80% by weight of the polymer composition as claimed in claim 1, and 90% to 20% by weight of organic solvent.

24. The concentrate as claimed in claim 23, wherein the organic solvent is a mixture of aliphatic and aromatic hydrocarbons.

25. The concentrate as claimed in claim 23, wherein the organic solvent contains at least 20% by weight of aromatic hydrocarbons.

26. The concentrate as claimed in claim 23, further comprising, in addition to the polymer composition, a wax dispersant and/or an asphaltene dispersant.

27. A process for improving the cold properties of a paraffin-containing mineral oil selected from the group consisting of crude oils, residue oils and products from mineral oil distillation, comprising the step of adding at least one polymer composition according to claim 1 to paraffin-containing mineral oil.

28. The process as claimed in claim 27, wherein the paraffin-containing mineral oil is crude oil.

29. The process as claimed in claim 27, wherein 10 to 10 000 ppm by weight of the polymer composition is added to the paraffin-containing mineral oil.

* * * * *